United States Patent [19]
Snell

[11] Patent Number: 5,949,695
[45] Date of Patent: Sep. 7, 1999

[54] INTERPOLATOR USING A PLURALITY OF POLYNOMIAL EQUATIONS AND ASSOCIATED METHODS

[75] Inventor: James Leroy Snell, Palm Bay, Fla.

[73] Assignee: Harris Corporation, Palm Bay, Fla.

[21] Appl. No.: 08/781,736

[22] Filed: Jan. 10, 1997

[51] Int. Cl.[6] .............................. G06F 17/17; H03M 7/00
[52] U.S. Cl. ..................... 364/723; 364/718.01; 332/103
[58] Field of Search .............................. 364/718.01, 723, 364/724.1; 332/103

[56] References Cited

U.S. PATENT DOCUMENTS

| | | | |
|---|---|---|---|
| 4,031,370 | 6/1977 | Catherall | 364/723 |
| 4,460,890 | 7/1984 | Busby | 340/347 DD |
| 4,511,882 | 4/1985 | Keyes, IV et al. | 364/723 X |
| 4,763,293 | 8/1988 | Takei et al. | 364/723 |
| 4,802,109 | 1/1989 | Machida | 364/723 |
| 4,823,000 | 4/1989 | Onyon | 250/231 SE |
| 5,001,479 | 3/1991 | Becker et al. | 341/96 |
| 5,063,291 | 11/1991 | Buehring | 250/231.16 |
| 5,068,816 | 11/1991 | Noetzel | 364/723 X |
| 5,109,481 | 4/1992 | Lathrop et al. | 395/133 |
| 5,191,336 | 3/1993 | Stephenson | 341/111 |
| 5,257,355 | 10/1993 | Akamatsu | 395/723 X |
| 5,293,233 | 3/1994 | Billing et al. | 348/581 |
| 5,379,241 | 1/1995 | Greggain | 364/723 |
| 5,418,818 | 5/1995 | Marchetto et al. | 375/264 |
| 5,502,662 | 3/1996 | Greggain | 364/723 |
| 5,502,795 | 3/1996 | Shirouzu | 395/109 |
| 5,554,945 | 9/1996 | Lee et al. | 327/105 |
| 5,764,113 | 6/1998 | Snell | 332/103 |

*Primary Examiner*—Ayaz R. Sheikh
*Assistant Examiner*—Douglas S. Lee
*Attorney, Agent, or Firm*—Allen, Dyer, Doppelt, Milbrath & Gilchrist, P.A.

[57] ABSTRACT

An interpolator includes: a first quadratic coefficient generator for generating a first coefficient set fitting a first quadratic equation to input samples $y_0$, $y_1$ and $y_2$ at $x_{-1}$, $x_0$, and $x_1$, respectively; a second quadratic coefficient generator for generating a second coefficient set fitting a second quadratic equation to input samples $y_1$, $y_2$ and $y_3$ at $x_0$, $x_1$ and $x_2$, respectively; a bi-quadratic coefficient generator for generating a bi-quadratic coefficient set based upon the first and second coefficient sets; and an output circuit for generating an interpolated value for between $x_0$ and $x_1$ based upon the bi-quadratic coefficient set. The bi-quadratic generator preferably generates the bi-quadratic coefficient set based upon an average of the first and second coefficient sets. Accordingly, the bi-quadratic coefficient set of $b_0$, $b_1$ and $b_2$ is given by $b_0=y_1$, $b_1=(-y_3+5y_2-3y_1-y_0)/4$, and $b_2=(y_3-y_2-y_1+y_0)/4$. The interpolated value $y(\Delta x)$ is equal to $b_0+\Delta x(b_1+\Delta x b_2)$. Polynomial coefficient generators may be used for polynomial equations of orders higher than two as in the quadratic equations. In addition, method aspects of the invention are also disclosed.

35 Claims, 2 Drawing Sheets

INTERPOLATOR USING A PLURALITY OF POLYNOMIAL EQUATIONS AND ASSOCIATED METHODS

FIELD OF THE INVENTION

The present invention relates to the field of signal processing, and, more particularly, to an interpolator and related methods.

BACKGROUND OF THE INVENTION

An interpolator is a digital electronic circuit typically used to increase the sampling rate of data. In other words, an interpolator can generate one or more interpolated points between two successive input data points. There are several types of conventional interpolators, such as, for example, finite impulse response (FIR) interpolators, halfband interpolators, cascaded integrator-comb (CIC) interpolators, and polynomial interpolators.

Interpolators are widely used in various signal processing application. For example, U.S. Pat. No. 5,109,481 to Marchetto et al. discloses a system for quadratic and higher order interpolation of pixel color and other pixel values into a bitmap image that enables enhanced shading for generating realistic computer graphics images. U.S. Pat. No. 4,823,000 to Onyon discloses an interpolator for a position encoder, and U.S. Pat. No. 5,063,291 to Buehring discloses an interpolator particularly for use with an optical grating for detecting position in a metrological apparatus. U.S. Pat. No. 5,554,945 to Lee et al. discloses a voltage controlled phase shifter employing a pair of phase interpolators.

The FIR interpolator, for example, is typically used for shaping or filtering a function. Unfortunately, the FIR interpolator usually requires many multipliers and adders, thereby complicating the circuitry and increasing the cost. The CIC interpolator may also require many adders, and full precision is typically required in the integrator section of the circuit. Polynomial interpolators have not achieved widespread use, perhaps due to the popularity of halfband and poly-phase FIR interpolators.

A quadratic interpolator is a form of polynomial interpolator which uses only two multipliers. Quadratic interpolation is performed by fitting a quadratic equation of the form $y=b_2x^2+b_1x+b_0$ to three known sample points, as disclosed, for example, in U.S. Pat. No. 5,502,662 to Greggain. The patent further discloses quadratic interpolation using reference points determined in such a manner as to eliminate phase distortion and spatial variation. The determination of these reference points uses a linear interpolator for selecting the mid-point between input samples. The interpolated points are used as reference points for a quadratic interpolation where the space between the reference points is one half a distance between respective known sample points.

Unfortunately, a quadratic interpolator may have relatively poor aliasing rejection because only three values are typically used to calculate the quadratic equation coefficients. Other types of interpolators may have better performance, but may require a relatively high degree of circuit complexity, particularly in the number of multiplications and additions that are required.

SUMMARY OF THE INVENTION

In view of the foregoing background it is therefore an object of the present invention to provide an interpolator and related method wherein the interpolator provides good performance, but which is also relatively simple in circuit requirements, such as the number of multipliers and adders.

These and other objects, features, and advantages of the present invention are provided by an interpolator comprising: first quadratic coefficient generating means for generating a first coefficient set fitting a first quadratic equation to input samples $y_0$, $y_1$ and $y_2$ at $x_{-1}$, $x_0$, and $x_1$, respectively; and second quadratic coefficient generating means for generating a second coefficient set fitting a second quadratic equation to input samples $y_1$, $y_2$ and $y_3$ at $x_0$, $x_1$ and $x_2$, respectively. Bi-quadratic coefficient generating means is preferably provided for generating a bi-quadratic coefficient set based upon the first and second coefficient sets. Output means preferably generates an interpolated value for between $x_0$ and $x_1$ based upon the bi-quadratic coefficient set. The bi-quadratic generating means preferably comprises averaging means for generating the bi-quadratic coefficient set based upon an average of the first and second coefficient sets.

The averaging means preferably generates the bi-quadratic coefficient set comprising $b_0$, $b_1$ and $b_2$ so that $b_0=y_1$, $b_1=(-y_3+5y_2-3y_1-y_0)/4$, and $b_2=(y_3-y_2-y_1+y_0)/4$. The output means also preferably comprises means for generating the interpolated value $y(\Delta x)=b_0+\Delta x(b_1+\Delta xb_2)$. The bi-quadratic interpolator provides better aliasing rejection than a single quadratic interpolator, and the coefficient calculation is only slightly more complex for the bi-quadratic interpolator, than for a single quadratic interpolator.

Considered in somewhat different terms, the interpolator preferably comprises: first polynomial coefficient generating means for generating a first coefficient set fitting a first polynomial equation to a first set of input samples over a first interval; second polynomial coefficient generating means for generating a second coefficient set fitting a second polynomial equation to a second set of input samples over a second interval overlapping the first interval at a central interval; and interpolated value generating means for generating an interpolated value for the central interval and based upon the first and second coefficient sets. In the bi-quadratic embodiment of the invention, both the first and second polynomial equations are of second order, that is, both equations are quadratic.

The output means of the interpolator may also, comprise continuous interpolating output means for varying $\Delta x$ linearly with time to continuously generate interpolated values. In addition, the output means preferably comprises at least one adder and at least one multiplier for operating on the polynomial or bi-quadratic coefficient set.

A method aspect of the invention is for interpolating a series of input samples. The method preferably comprises the steps of: generating a first coefficient set fitting a first polynomial equation to a first set of input samples over a first interval; generating a second coefficient set fitting a second polynomial equation to a second set of input samples over a second interval overlapping the first interval at a central interval; and generating an interpolated value for the central interval and based upon the first and second coefficient sets. In one embodiment, each of the polynomial equations is a second order or quadratic equation, and the average of the first and second coefficient sets may be used for generating the interpolated value.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
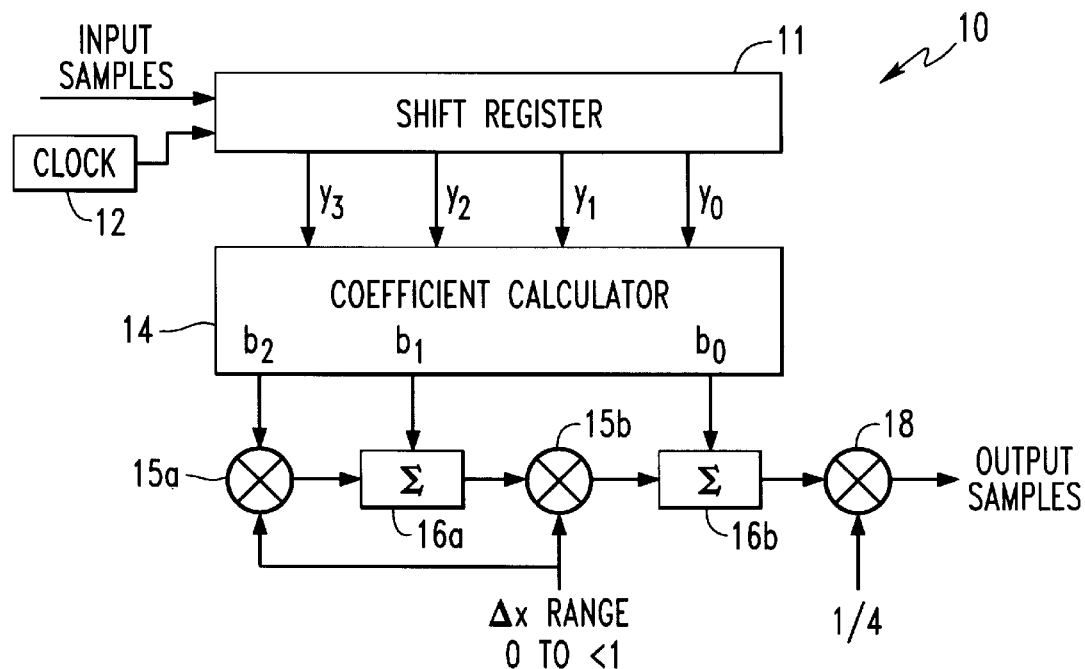
FIG. 1 is a schematic block diagram of a bi-quadratic interpolator in accordance with the present invention.
Figure 2:
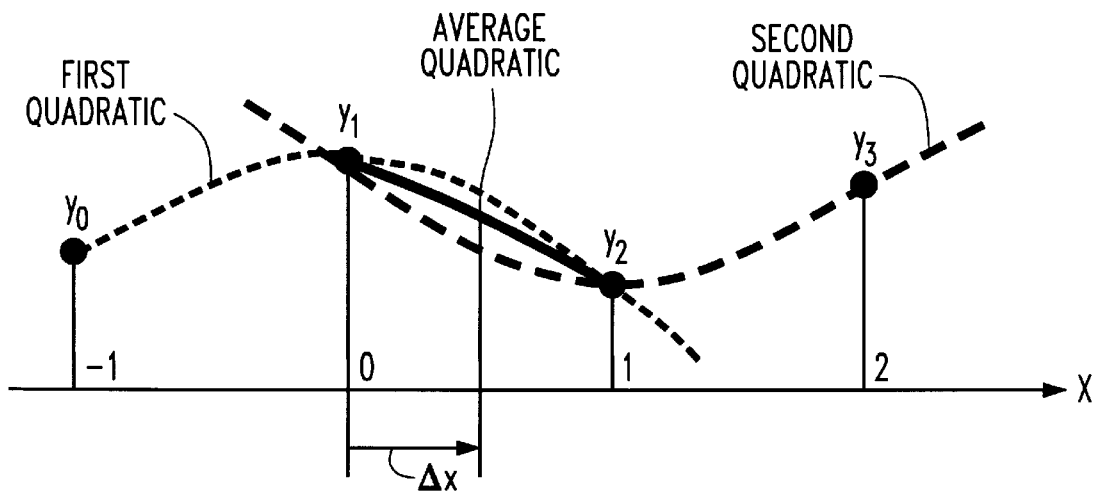
FIG. 2 is a graph of a plot of the first and second quadratic equation plots, as well as an average bi-quadratic equation plot produced by the bi-quadratic interpolator in accordance with the invention.

An embodiment of a bi-quadratic interpolator 10 according to the present invention is understood with reference to the schematic block diagram of FIG. 1 and the waveform diagram of FIG. 2. The illustrated embodiment of the bi-quadratic interpolator 10 accepts a plurality of input samples that are clocked into the shift register 11 by the clock signal from the clock 12. In other words, the signal input samples are clocked into the shift register 11 at the clock rate as would be readily understood by those skilled in the art. More particularly, the bi-quadratic interpolator 10 includes first quadratic coefficient generating means for generating a first coefficient set fitting a first quadratic equation to input samples $y_0$, $y_1$ and $y_2$ at $x_{-1}$, $x_0$, and $x_1$, respectively. The generation of the first coefficient set is shown by the plot labelled "First Quadratic" in FIG. 2. For the interval $x_{-1}$ to $x_0$ to $x_1$, the quadratic coefficients are: $b_0=y_1$, $b_1=(y_2-y_0)/2$, and $b_2=(y_2-2y_1+y_0)/2$ as would be readily appreciated by those skilled in the art.

The bi-quadratic interpolator 10 also includes second quadratic coefficient generating means for generating a second coefficient set fitting a second quadratic equation to input samples $y_1$, $y_2$ and $y_3$ at $x_0$, $x_1$ and $x_2$, respectively. The "Second Quadratic" equation is also shown in FIG. 2 and is defined over the interval $x_0$ to $x_1$ to $x_2$ by the quadratic coefficients: $b_0=y_1$, $b_1=(-y_3+4y_2-3y_1)/2$, and $b_2=(y_3-2y_2+y_1)/2$ as would also be readily appreciated by those skilled in the art.

The illustrated bi-quadratic interpolator 10 also includes bi-quadratic coefficient generating means for generating a bi-quadratic coefficient set based upon the first and second coefficient sets. In the illustrated embodiment, the first and second quadratic coefficient generating means and the bi-quadratic coefficient generating means are schematically shown by the coefficient calculator 14. The bi-quadratic coefficient generating means generates the bi-quadratic coefficient set by averaging the coefficients so that $b_0=y_1$, $b_1=(-y_3+5y_2-3y_1-y_0)/4$, and $b_2=(y_3-y_2-y_1+y_0)/4$ for the central interval $x_0$ to $x_1$. The "Average Quadratic" equation is also illustrated in FIG. 2. The present invention contemplates other processing techniques based upon the first and second coefficient sets, such as weighting each, for example, as would be readily understood by those skilled in the art.

The bi-quadratic coefficient set comprising $b_0$, $b_1$ and $b_2$ can be readily used for generating the interpolated value $y(\Delta x) = b_0 + \Delta x(b_1 + \Delta x b_2)$ in the output means provided by the illustrated arrangement of multipliers 15a, 15b and adders 16a, 16b. The ¼ multiplier 18 is merely a binary point shift and does not require hardware. While the coefficients are held, $\Delta x$ can vary at a higher rate than the input clock rate.

In order to continuously interpolate, $\Delta x$ may be varied linearly with time between 0 and 1. Then a new sample is shifted in, a new set of coefficients are calculated and $\Delta x$ is again varied linearly between 0 and 1.

Polynomial interpolators are particularly useful when $\Delta y$ is small and $\Delta x$ is in the range of 0 to 1. Of course, any interpolator should also be evaluated for its goodness of fit to the desired function as would be readily understood by those skilled in the art. The bi-quadratic interpolator 10 provides better aliasing rejection than a single quadratic interpolator, in part, because four instead of three values are used to calculate the coefficients. Moreover, the coefficient calculation is only slightly more complex for the bi-quadratic interpolator, than for a single quadratic interpolator. Of course, the bi-quadratic interpolator 10 may be readily implemented in integrated circuit form, as would be readily appreciated by those skilled in the art.

Those of skill in the art will also recognize that the interpolator may also be used with other higher order polynomials than the illustrated quadratic equations as described above with reference to FIGS. 1 and 2. As shown in the schematic diagram of FIG. 3, another embodiment of the interpolator 20 may include: a sample generator 21; first polynomial coefficient generating means 22a for generating a first coefficient set fitting a first polynomial equation to a first set of input samples over a first interval; $n^{th}$ polynomial coefficient generating means 22n for generating an $n^{th}$ coefficient set fitting an $n^{th}$ polynomial equation to an $n^{th}$ set of input samples over an $n^{th}$ interval overlapping the first interval at a central interval; and interpolated value generating means for generating an interpolated value for the central interval and based upon the first and second coefficient sets. The polynomials may be of $m^{th}$ order, two or greater, and preferably of even order. In the bi-quadratic embodiment of the interpolator 10, both the first and second polynomial equations are of second order, that is, both equations are quadratic.

Figure 3:
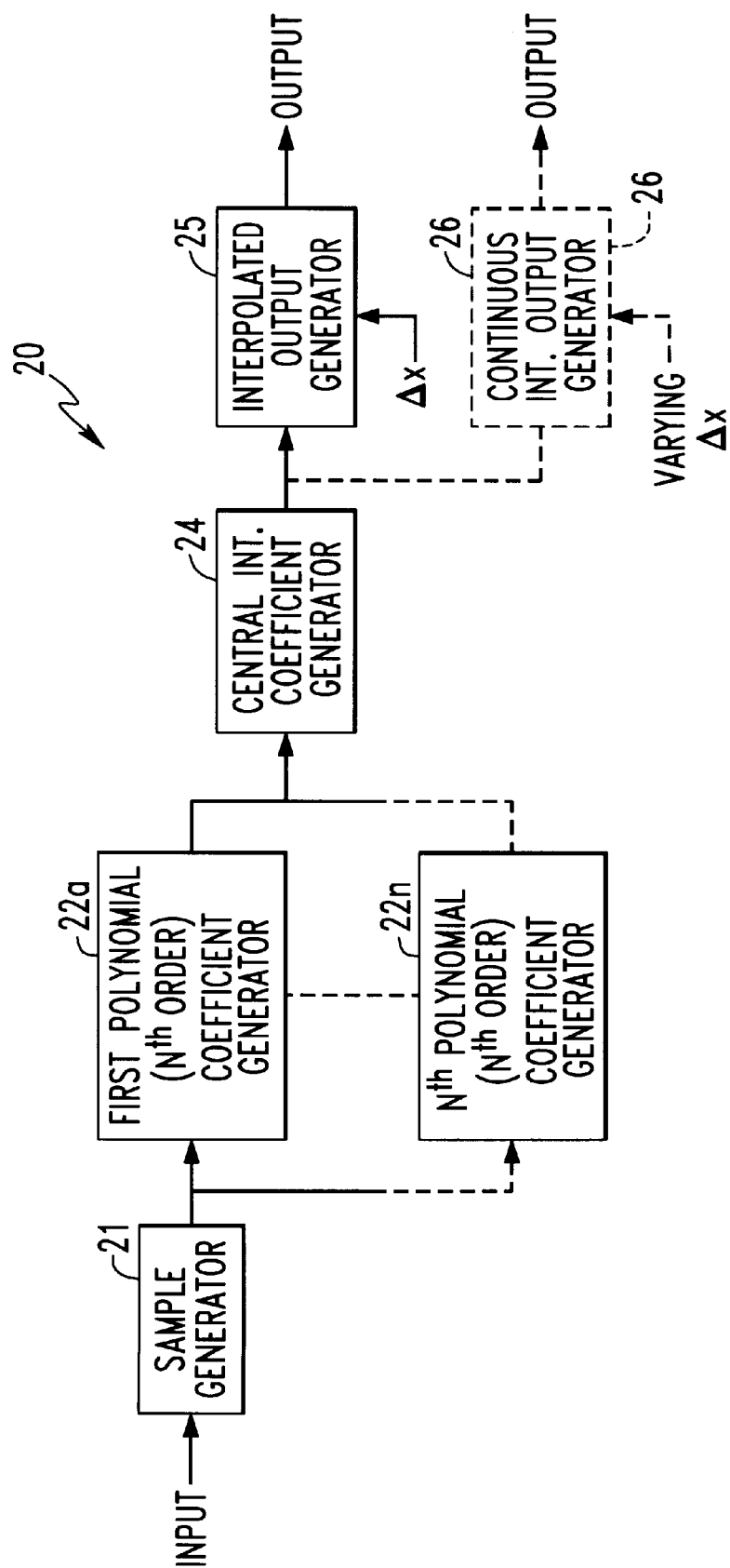
FIG. 3 is a schematic block diagram of another interpolator in accordance with the invention.

The interpolated value generating means is provided in the illustrated embodiment of FIG. 3 by a coefficient generator 24 for the central interval, and the interpolated output generator 25 which uses the coefficients to generate the interpolated output based on $\Delta x$ as would be readily understood by those skilled in the art. Optionally, continuous interpolated outputs may be provided by the continuous interpolator output means 26 which is fed a varying $\Delta x$ input signal as would also be readily understood by those skilled in the art.

A method aspect of the invention is for interpolating a series of input samples. The method preferably comprises the steps of: generating a first coefficient set fitting a first polynomial equation to a first set of input samples over a first interval; generating a second coefficient set fitting a second polynomial equation to a second set of input samples over a second interval overlapping the first interval at a central interval; and generating an interpolated value for the central interval and based upon the first and second coefficient sets. In one embodiment, each of the polynomial equations is a second order or quadratic equation, and the average of the first and second coefficient sets is used for generating the interpolated value.

The step of generating the first coefficient set preferably comprises generating the first coefficient set for input samples $y_0$, $y_1$ and $y_2$ at $x_{-1}$, $x_0$ and $x_1$, respectively. The step of generating the second polynomial coefficient set preferably comprises generating the second coefficient set for input samples $y_1$, $y_2$ and $y_3$ at $x_0$, $x_1$ and $x_2$, respectively. The step of generating the interpolated value preferably comprises generating an average polynomial coefficient set based upon an average of the first and second coefficient sets. In addition, the step of generating the average polynomial coefficients preferably includes the step of generating the average polynomial coefficient set comprising $b_0$, $b_1$ and $b_2$ so that $b_0=y_1$, $b_1=(-y_3+5y_2-3y_1-y_0)/4$, and $b_2=(y_3-y_2-y_1+y_0)/4$.

The step of generating the interpolated value may also further include generating the interpolated value $y(\Delta x)=b_0+\Delta x(b_1+\Delta xb_2)$. The step of generating the interpolated value in an alternate embodiment may comprise varying $\Delta x$ linearly with time to continuously generate interpolated values.

The step of generating the interpolated value may include at least one adding step and at least one multiplication step. For the bi-quadratic embodiment, two multipliers and two adders may be used. Each of the first and second polynomials is preferably at least a second order polynomial.

Those of skill in the art will recognize many possible applications for the interpolator in accordance with the present invention, such as, for example, as a low-pass filter or a digital upconverter. In particular, the interpolator in accordance with the present invention may be used in combination with a finite impulse response (FIR) filter to provide a two-stage re-sampling circuit as described in copending patent application entitled "Re-Sampling Circuit and Associated Method" having Ser. No. 08/781,334, assigned to the assignee of the present invention, filed concurrently herewith, and the entire disclosure of which is incorporated herein by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An interpolator comprising:
   sampling means for sampling an input signal and generating a series of input samples $y_0$, $y_1$, $y_2$ and $y_3$ at $x_{-1}$, $x_0$, $x_1$ and $x_2$, respectively;
   first quadratic coefficient generating means for generating a first coefficient set fitting a first quadratic equation to input samples $y_0$, $y_1$ and $y_2$ at $x_{-1}$, $x_0$, and $x_1$, respectively;
   second quadratic coefficient generating means for generating a second coefficient set fitting a second quadratic equation to input samples $y_1$, $y_2$ and $y_3$ at $x_0$, $x_1$ and $x_2$, respectively;
   bi-quadratic coefficient generating means for generating a bi-quadratic coefficient set based upon the first and second coefficient sets; and
   output means for generating an interpolated value for between $x_0$ and $x_1$ based upon the bi-quadratic coefficient set.

2. An interpolator according to claim 1 wherein said bi-quadratic generating means comprises averaging means for generating the bi-quadratic coefficient set based upon an average of the first and second coefficient sets.

3. An interpolator according to claim 2 wherein said averaging means comprises means for generating the bi-quadratic coefficient set comprising $b_0$, $b_1$ and $b_2$ so that $b_0=y_1$, $b_1=(-y_3+5y_2-3y_1-y_0)/4$, and $b_2=(y_3-y_2-y_1+y_0)/4$.

4. An interpolator according to claim 3 wherein said output means comprises means for generating the interpolated value $y(\Delta x)=b_0+\Delta x(b_1+\Delta xb_2)$.

5. An interpolator according to claim 4 wherein said output means comprises continuous interpolating output means for varying $\Delta x$ linearly with time to continuously generate interpolated values.

6. An interpolator according to claim 1 wherein said output means comprises at least one adder and at least one multiplier for operating on the bi-quadratic coefficient set.

7. An interpolator according to claim 1 wherein said sampling means comprises a shift register for storing input samples therein.

8. An interpolator according to claim 7 further comprising a clock having a clock rate and being connected to said sampling means for causing said sampling means to sample an input signal at a rate related to the clock rate.

9. An interpolator for a series of input samples, the interpolator comprising:
   first polynomial coefficient generating means for generating a first coefficient set fitting a first polynomial equation to a first set of input samples over a first interval;
   second polynomial coefficient generating means for generating a second coefficient set fitting a second polynomial equation to a second set of input samples over a second interval overlapping the first interval at a central interval; and
   interpolated value generating means for generating an interpolated value for the central interval and based upon the first and second coefficient sets.

10. An interpolator according to claim 9 wherein said first polynomial coefficient generating means comprises means for generating the first coefficient set for input samples $y_0$, $y_1$ and $y_2$ at $x_{-1}$, $x_0$ and $x_1$, respectively; and wherein said second polynomial coefficient generating means comprises means for generating the second coefficient set for input samples $y_1$, $y_2$ and $y_3$ at $x_0$, $x_1$ and $x_2$, respectively.

11. An interpolator according to claim 10 wherein said interpolated value generating means comprises averaging means for generating an average polynomial coefficient set based upon an average of the first and second coefficient sets.

12. An interpolator according to claim 11 wherein said averaging means comprises means for generating the average polynomial coefficient set comprising $b_0$, $b_1$ and $b_2$ so that $b_0=y_1$, $b_1=(-y_3+5y_2-3y_1-y_0)/4$, and $b_2=(y_3-y_2-y_1+y_0)/4$.

13. An interpolator according to claim 12 wherein said interpolated value generating means comprises means for generating the interpolated value $y(\Delta x)=b_0+\Delta x(b_1+\Delta xb_2)$.

14. An interpolator according to claim 13 wherein said interpolated value generating means comprises continuous interpolating output means for varying $\Delta x$ linearly with time to continuously generate interpolated values.

15. An interpolator according to claim 14 wherein said interpolated value generating means comprises at least one adder and at least one multiplier.

16. An interpolator according to claim 9 wherein each of the first and second polynomials is at least a second order polynomial.

17. An interpolator for a series of input samples, the interpolator comprising:
   first polynomial coefficient generating means for generating a first coefficient set fitting a first polynomial equation to a first set of input samples over a first interval, the first polynomial being of at least second order;
   second polynomial coefficient generating means for generating a second coefficient set fitting a second polynomial equation to a second set of input samples over a second interval overlapping the first interval at a central interval, the second polynomial being of at least second order; and interpolated value generating means for generating an interpolated value for the central interval and based upon an average of the first and second coefficient sets.

18. An interpolator according to claim 17 wherein said first polynomial coefficient generating means comprises means for generating the first coefficient set for input samples $y_0$, $y_1$ and $y_2$ at $x_{-1}$, $x_0$ and $x_1$, respectively; wherein said second polynomial coefficient generating means comprises means for generating the second coefficient set for input samples $y_1$, $y_2$ and $y_3$ at $x_0$, $x_1$ and $x_2$, respectively; and wherein the interpolated value generating means generates an average polynomial coefficient set comprising $b_0$, $b_1$ and $b_2$ so that $b_0=y_1$, $b_1=(-y_3+5y_2-3y_1-y_0)/4$, and $b_2=(y_3-y_2-y_1+y_0)/4$.

19. An interpolator according to claim 18 wherein said interpolated value generating means comprises means for generating the interpolated value $y(\Delta x)=b_0+\Delta x(b_1+\Delta xb_2)$.

20. An interpolator according to claim 17 wherein said interpolated value generating means comprises continuous interpolating output means for varying $\Delta x$ linearly with time to continuously generate interpolated values.

21. An interpolator according to claim 17 wherein said interpolated value generating means comprises at least one adder and at least one multiplier.

22. An interpolation method for a plurality of input samples $y_0$, $y_1$, $y_2$ and $y_3$ at $x_{-1}$, $x_0$, $x_1$ and $x_2$, respectively, the method comprising the steps of:

generating a first coefficient set fitting a first quadratic equation to input samples $y_0$, $y_1$ and $y_2$ at $x_{-1}$, $x_0$, and $x_1$, respectively;

generating a second coefficient set fitting a second quadratic equation to input samples $y_1$, $y_2$ and $y_3$ at $x_0$, $x_1$ and $x_2$, respectively;

generating a bi-quadratic coefficient set based upon the first and second coefficient sets; and generating an interpolated value for between $x_0$ and $x_1$ based upon the bi-quadratic coefficient set.

23. A method according to claim 22 wherein the step of generating the bi-quadratic coefficient set comprises averaging the first and second coefficient sets.

24. A method according to claim 23 wherein the step of averaging means comprises generating the bi-quadratic coefficient set comprising $b_0$, $b_1$ and $b_2$ so that $b_0=y_1$, $b_1=(-y_3+5y_2-3y_1-y_0)/4$, and $b_2=(y_3-y_2-y_1+y_0)/4$.

25. A method according to claim 24 wherein the step of generating the interpolated value comprises generating the interpolated value $y(\Delta x)=b_0+\Delta x(b_1+\Delta xb_2)$.

26. A method according to claim 25 wherein the step of generating the interpolated value comprises varying $\Delta x$ linearly with time to continuously generate interpolated values.

27. A method according to claim 22 wherein the step of generating the interpolated value comprises at least one adding step and at least one multiplying step.

28. An interpolation method for a series of input samples, the method comprising the steps of:

generating a first coefficient set fitting a first polynomial equation to a first set of input samples over a first interval;

generating a second coefficient set fitting a second polynomial equation to a second set of input samples over a second interval overlapping the first interval at a central interval; and generating an interpolated value for the central interval and based upon the first and second coefficient sets.

29. A method according to claim 28 wherein the step of generating the first coefficient set comprises generating the first coefficient set for input samples $y_0$, $y_1$ and $y_2$ at $x_{-1}$, $x_0$ and $x_1$, respectively; and wherein the step of generating the second polynomial coefficient set comprises generating the second coefficient set for input samples $y_1$, $y_2$ and $y_3$ at $x_0$, $x_1$ and $x_2$, respectively.

30. A method according to claim 29 wherein the step of generating the interpolated value comprises generating an average polynomial coefficient set based upon an average of the first and second coefficient sets.

31. A method according to claim 30 wherein the step of generating the average polynomial coefficients comprise generating the average polynomial coefficient set comprising $b_0$, $b_1$ and $b_2$ so that $b_0=y_1$, $b_1=(-y_3+5y_2-3y_1-y_0)/4$, and $b_2=(y_3-y_2-y_1+y_0)/4$.

32. A method according to claim 31 wherein the step of generating the interpolated value further comprises generating the interpolated value $y(\Delta x)=b_0+\Delta x(b_1+\Delta xb_2)$.

33. A method according to claim 32 wherein the step of generating the interpolated value comprises varying $\Delta x$ linearly with time to continuously generate interpolated values.

34. A method according to claim 28 wherein the step of generating the interpolated value comprises at least one adding step and at least one multiplying step.

35. A method according to claim 28 wherein each of the first and second polynomials is at least a second order polynomial.

* * * * *

UNITED STATES PATENT AND TRADEMARK OFFICE
CERTIFICATE OF CORRECTION

PATENT NO. : 5,949,695
DATED : September 7, 1999
INVENTOR(S) : James Leroy SNELL It is certified that error appears in the above-identified patent and that said Letters Patent is hereby corrected as shown below:

Column 5 line 64  Strike: " $(-y_3 + 5y_2 - 3y_1y_0)/4$ "
Insert: -- $(-y_3 + 5y_2 - 3y_1 - y_0)/4$ --

Signed and Sealed this

Twenty-ninth Day of February, 2000

*Attest:*

Q. TODD DICKINSON

*Attesting Officer*  *Commissioner of Patents and Trademarks*